United States Patent
Tanaka et al.

(10) Patent No.: US 7,133,056 B2
(45) Date of Patent: Nov. 7, 2006

(54) IMAGE FORMING APPARATUS AND IMAGE FORMING METHOD

(75) Inventors: Tomoji Tanaka, Chiyoda-ku (JP); Kenya Haba, Chiyoda-ku (JP); Hideki Hino, Chiyoda-ku (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 261 days.

(21) Appl. No.: 10/810,895

(22) Filed: Mar. 29, 2004

(65) Prior Publication Data

US 2005/0212887 A1 Sep. 29, 2005

(30) Foreign Application Priority Data

Mar. 27, 2003 (JP) ............................. 2003-087965

(51) Int. Cl.
*G03G 15/01* (2006.01)
(52) U.S. Cl. ...................................... 347/116; 399/301
(58) Field of Classification Search ................ 347/116; 399/301
See application file for complete search history.

(56) References Cited

U.S. PATENT DOCUMENTS

| | | | | |
|---|---|---|---|---|
| 5,550,625 | A * | 8/1996 | Takamatsu et al. | 399/301 |
| 6,218,660 | B1 * | 4/2001 | Hada | 250/226 |
| 6,327,453 | B1 * | 12/2001 | Imaizumi et al. | 399/301 |
| 6,791,590 | B1 * | 9/2004 | Misaizu et al. | 347/115 |

FOREIGN PATENT DOCUMENTS

| | | |
|---|---|---|
| JP | 08-305108 | 11/1996 |
| JP | 11-231586 | 8/1999 |
| JP | 2000-194176 | 7/2000 |
| JP | 2001-255714 | 9/2001 |

OTHER PUBLICATIONS

Japanese Office Action mailed Oct. 11, 2005, directed to counterpart JP Application No. 2003-087965.

* cited by examiner

*Primary Examiner*—Huan Tran
(74) *Attorney, Agent, or Firm*—Morrison & Foerster LLP

(57) ABSTRACT

It is intended to provide an image forming apparatus and image forming method capable of obtaining a comparatively high-quality image output even under a correction mode that gives preference to processing time required for correction, and capable of suppressing interruption of image formation to the utmost under operational condition such that internal temperature changes continuously. There are saved last five detections of positional shift quantity under first correction mode that gives preference to correction accuracy for each temperature band. Under second correction mode that gives preference to processing time required for correction, there is calculated a difference of a value actually obtained through measurement and an average value of data history belonging to a target temperature band (#7 through #9). Furthermore, the difference is multiplied by a reliability coefficient of main scanning direction and that of sub scanning direction, respectively, to determine correction quantity (#10, #11). Thereby, excessive change of correction quantity is prevented.

20 Claims, 10 Drawing Sheets

IMAGE FORMING APPARATUS AND IMAGE FORMING METHOD

This application is based on Application No. 2003-87965 filed in Japan, contents of which is hereby incorporated by reference.

BACKGROUND OF THE INVENTION

1. Field of the Invention

The present invention relates to an image forming apparatus and image forming method wherein independent plural image forming units form primary images respectively and those primary images are superimposed on a medium to form a resultant image. More particularly, it relates to an image forming apparatus and image forming method that conducts positional correction with respect to superimposing position of each primary image.

2. Description of Related Art

There have been used tandem-type image forming apparatuses such as color printers, color copiers, and the like, wherein independent plural image forming sections for each color form their respective single color images and the single color images are superimposed on a carrying belt or on printing material mounted on the carrying belt. Tandem-type image forming apparatuses have an advantage such that output speed of a color image is fast in comparison with multi-cycle type ones in which each single color image is formed and superimposed at same image forming section in order. On the other hand, tandem-type ones need special device to secure superimposition accuracy among colors. That is, there occur uneven rotation among rotating members such as photosensitive drums of respective image forming section and uneven running of a carrying belt, due to degree of mechanical accuracy or the like. In case image formation is made without mending such uneven operations, images of respective colors do not meet one another and color shift occurs.

Image forming apparatuses of this type have conventionally been designed to execute a correction mode to correct such color shift. That is, under a correction mode, respective image forming sections form respective test patterns to meet positions of respective color images on a carrying belt. Positions of respective test pattern are read so as to grasp degree of positional shift of respective colors. Thereby, positional correction data of respective colors can be obtained for actual image formation. When actual image formation, images of respective colors are formed on positions corrected in accordance with positional correction data, whereby superimposition accuracy among respective color images is secured.

JP Laid-open Patent Publication No. 2000-194176 discloses an image forming apparatus that executes such correction mode. The image forming apparatus directed to No. 2000-194176 has two correction modes, namely, a first correction mode that gives preference to processing time required for correction, and a second correction mode that gives preference to correction accuracy. By selecting and using those two correction modes properly, the image forming apparatus intends to secure superimposition accuracy and prevent image formation speed from lowering. Furthermore, an image forming apparatus directed to JP Laid-open Patent Publication No. 8-305108 discloses system to detect internal temperature. That is, heat expansion occurring to each section due to internal temperature potentially causes positional shift among respective color images. Furthermore, in No. 8-305108, it is determined whether or not correction mode should be executed basing on internal temperature and past history. This mechanism intends to reduce execution frequency of correction mode that causes printer operation to stop.

However, those conventional image forming apparatuses have had the following problems. As to No. 2000-194176, correction accuracy is significantly low under first correction mode that gives preference to processing time required for correction. As to No. 8-305108, color shift correction could not be conducted appropriately under operational condition such that internal temperature changes continuously, e.g., during multi-printing operation or the like. In the event, multi-printing operation is sometimes forcedly interrupted due to correction mode execution. Therefore, actual productivity was poor.

SUMMARY OF THE INVENTION

The present invention has been made in order to solve the foregoing problems. It is intended to provide an image forming apparatus and image forming method capable of obtaining a considerable high-quality image output even under a correction mode that gives preference to processing time required for correction, and capable of suppressing interruption of image formation to the utmost under operational condition such that internal temperature changes continuously.

According to one aspect of the present invention, there is provided an image forming apparatus comprising: plural image forming sections; and a carrying belt on which primary images formed on the plural image forming sections respectively are transferred and superimposed, wherein the image forming apparatus further comprises: a test pattern forming device for forming test patterns on the carrying belt by using the plural image forming sections; a pattern sensor for reading a test pattern on the carrying belt; a positional shift calculating device for calculating positional shift quantity of main scanning direction and that of sub scanning direction basing on read result by the pattern sensor with respect to at least one correction target color; a correction quantity determining device for determining correction quantity of each scanning direction with respect to a correction target color(s) basing on positional shift quantity of each scanning direction calculated by the positional shift calculating device and reliability coefficient of each scanning direction; and a positional correction device for conducting positional correction basing on correction quantity determined by the correction quantity determining device with respect to an images of a correction target color(s), out of respective images to be formed by the plural image forming sections, and reliability coefficients used by the correction quantity determining device differ by a main scanning direction and a sub scanning direction.

In this image forming apparatus, when color shift correction is conducted, the test pattern forming device forms a test pattern on the carrying belt by using each image forming section. Subsequently, the pattern sensor reads the test pattern on the carrying belt. Next, the positional shift calculating device calculates positional shift quantity of main scanning direction and that of sub scanning direction with respect to at least one correction target color(s) basing on a read result by the pattern sensor. Next, the correction quantity determining device determines correction quantity of each scanning direction with respect to the correction target color(s) basing on positional shift quantity of each scanning direction calculated by the positional shift calculating device and reliability coefficient value of which differs by each scanning direction. Generally, a value of reliability coefficient is with in a range of larger than 0 and same as or smaller than 1. In case reliability for correction is high, reliability coefficient close to 1 but not exceeding may be used. That is, positional shift quantity as almost obtained can be used. On the other hand, in case reliability for correction is low, reliability coefficient far from 1 may be used. That is, excessive correction is avoided by using positional shift quantity being suppressed in comparison with as obtained.

The carrying belt of the inventive image forming apparatus may be either one of the following types to transfer a superimposed image on it: a type that superimposition of primary images is made on a carrying belt and the superimposed image is transferred onto a recording medium; and a type that a carrying belt carries a recoding medium and primary images are transferred, in order, onto the recording medium to form a superimposed image.

Furthermore, according to the one aspect of the present invention, there is also provided an image forming method using plural image forming sections and a carrying belt on which primary images formed on the plural image forming sections respectively are transferred and superimposed, the image forming method comprising the steps of: forming test patterns on the carrying belt by using the plural image forming sections; reading a test pattern on the carrying belt with a pattern sensor; calculating positional shift quantity of main scanning direction and that of sub scanning direction basing on read result by the pattern sensor with respect to at least one correction target color; determining correction quantity of each scanning direction with respect to a correction target color(s) basing on positional shift quantity of each scanning direction and reliability coefficient of each scanning direction; and conducting positional correction basing on determined correction quantity, out of respective images to be formed by the plural image forming sections, wherein reliability coefficients used for determining correction quantity differ by a main scanning direction and a sub scanning direction.

The above and further objects and novel features of the invention will more fully appear from the following detailed description when the same is read n connection with the accompanying drawings. It is to be expressly understood, however, that the drawings are for the purpose of illustration only and are not intended as a definition of the limits of the invention.

BRIEF DESCRIPTION OF DRAWINGS

For a better understanding of the present invention, reference is made to the following detailed description of the invention, just in conjunction with the accompanying drawings in which.

DETAILED DESCRIPTION OF PREFERRED EMBODIMENTS

Reference will now be made in detail to presently a preferred embodiment of the invention as illustrated in the accompanying drawings. The present embodiment is applicable to a tandem-type color printer or a digital color copier.

Figure 1:
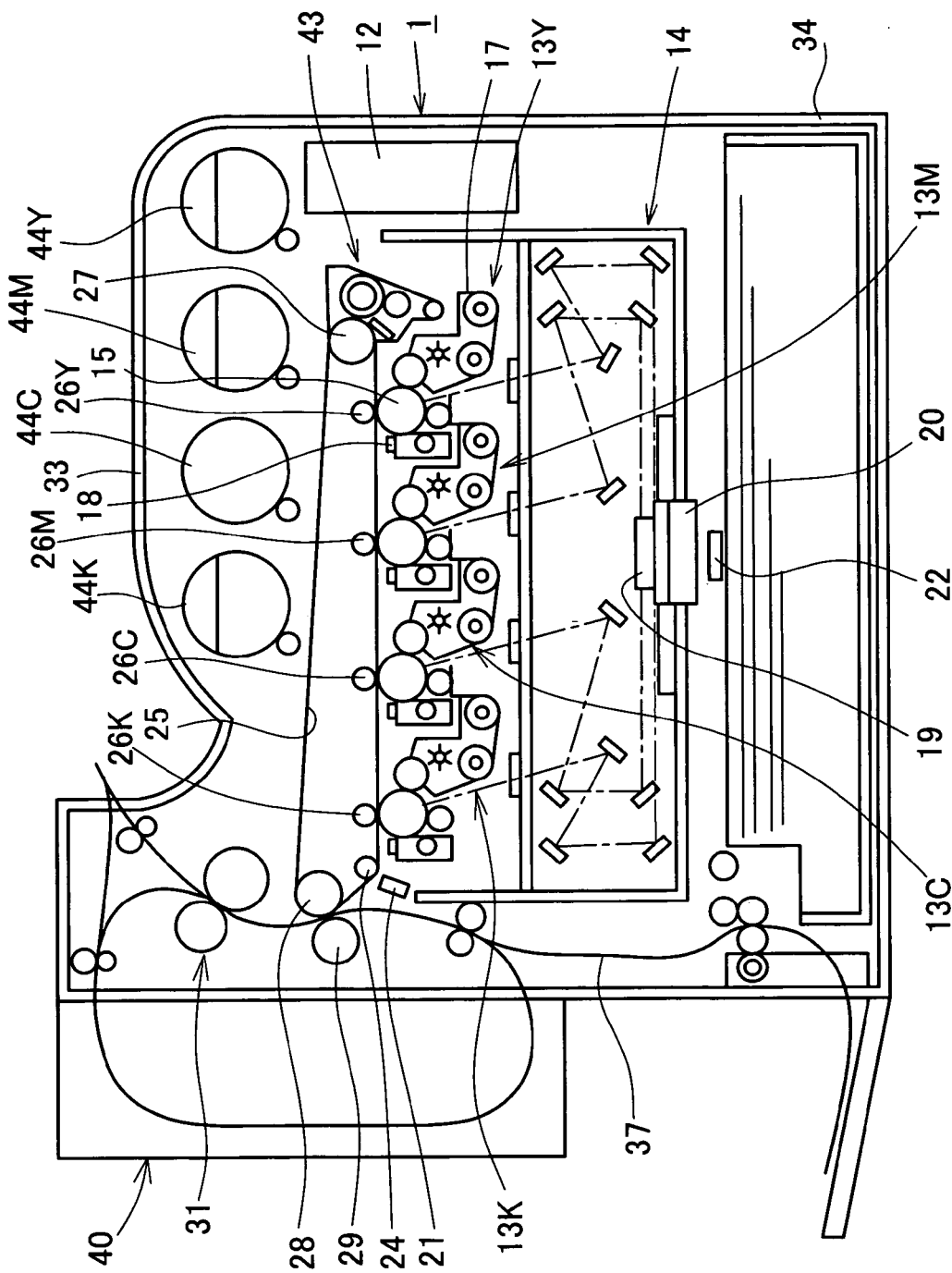
FIG. 1 shows structure of a digital color printer of the present embodiment.
Figure 2:
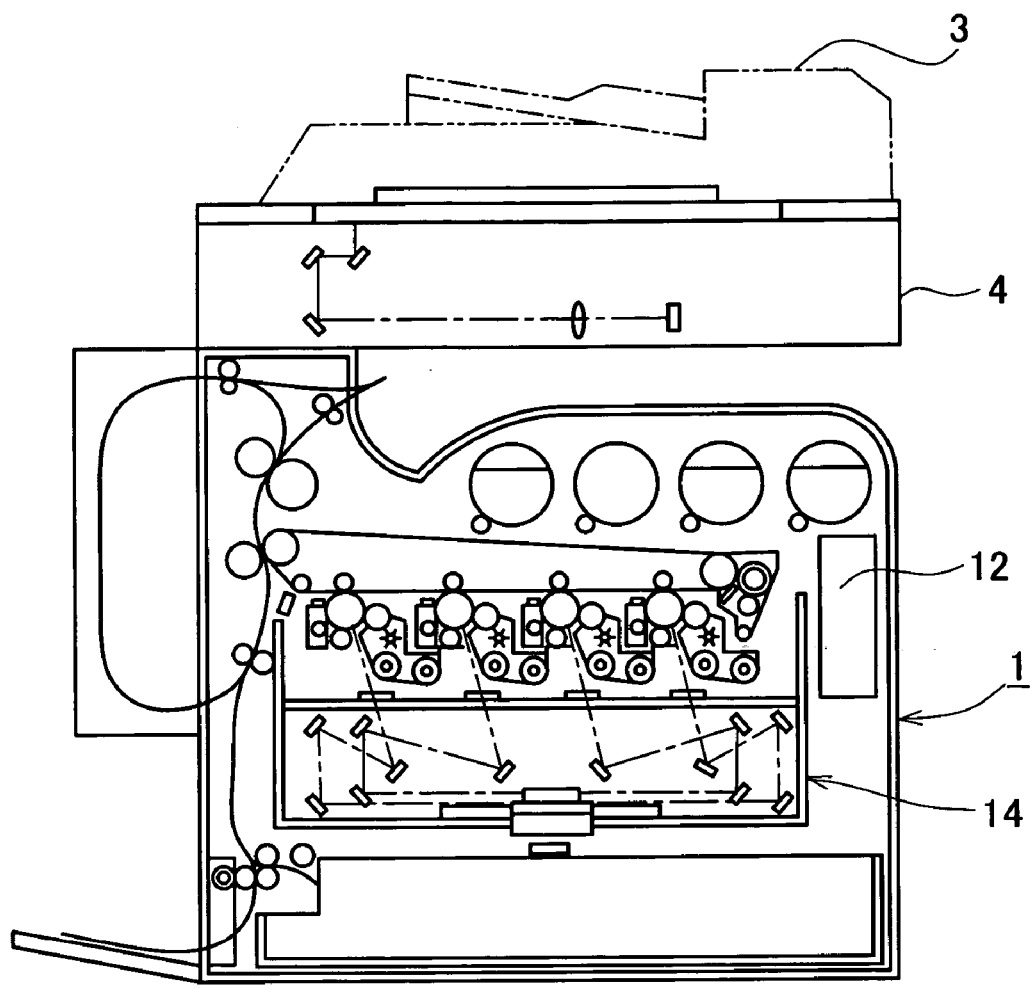
FIG. 2 shows structure of a digital color copier directed to the present embodiment.

A digital color printer 1 of the present embodiment is structured such as shown in FIG. 1. As shown in FIG. 2, a digital color copier of the present embodiment incorporates the digital color printer 1, an automatic document feeding apparatus 3 and an image reading apparatus 4.

The digital color printer 1 is mainly constituted by a loop-type intermediate transfer belt 25, and image forming units 13K (black), 13C (cyan), 13M (magenta), 13Y (yellow) arranged in a horizontal direction with reference to the intermediate transfer belt 25 with constant distance being taken between adjacent image forming units. Each of the image forming units 13K through 13Y has a well-known photosensitive drum 15, a developer 17, a cleaner 18, and the like. A print head section 14 is arranged below the image forming units. The print head section 14 has a polygon mirror 19 and rotation of the polygon mirror 19 scans laser beam on each photosensitive drum 15. Thereby, an electrostatic latent image is written on each photosensitive drum 15 and developed with toner of each color with each developer 17.

The intermediate transfer belt 25 is hanged and held tight with a drive roller 27, a backup roller 28 and a tension roller 24 keeping constant tension, and circularly driven clockwise in the figures. Furthermore, at the other side of each photosensitive drum 15 over the intermediate transfer belt 25, primary transfer rollers 26K through 26Y are arranged. Thereby, primary transfer of toner images, i.e., from each photosensitive drum 15 to the intermediate transfer belt 25, is conducted. At the other side of the backup roller over the intermediate transfer belt 25, a secondary transfer roller 29 is arranged. Furthermore, at a point further downstream of the image forming unit 13, the most downstream among the image forming units 13K through 13Y, pattern sensors 21 are arranged outside of the intermediate transfer belt 25. As described later, two pattern sensors 21 are arranged at both edges of an imaging region on the intermediate transfer belt 25 one by one. Thereby, registered patterns formed on the intermediate transfer belt 25 by each of the image forming units 13K through 13Y can be detected.

A paper feeding cassette 34 is arranged below the print head section 14. Sheets of printing paper are taken out from the paper feeding cassette 34 one by one. A sheet of printing paper taken out is carried along a carrying path 37 and passed between the intermediate transfer belt 25 and the secondary transfer roller 29. When a sheet passes between them, secondary transfer of toner images on the intermediate transfer belt is made onto the sheet. The digital color printer 1 further includes a fixer 31, a double-side printing unit 40, an ejection tray 33, an intermediate transfer belt cleaner 43, toner housing containers 44K through 44Y, an internal temperature sensor 22, an image processing section 12, and the like.

Figure 3:
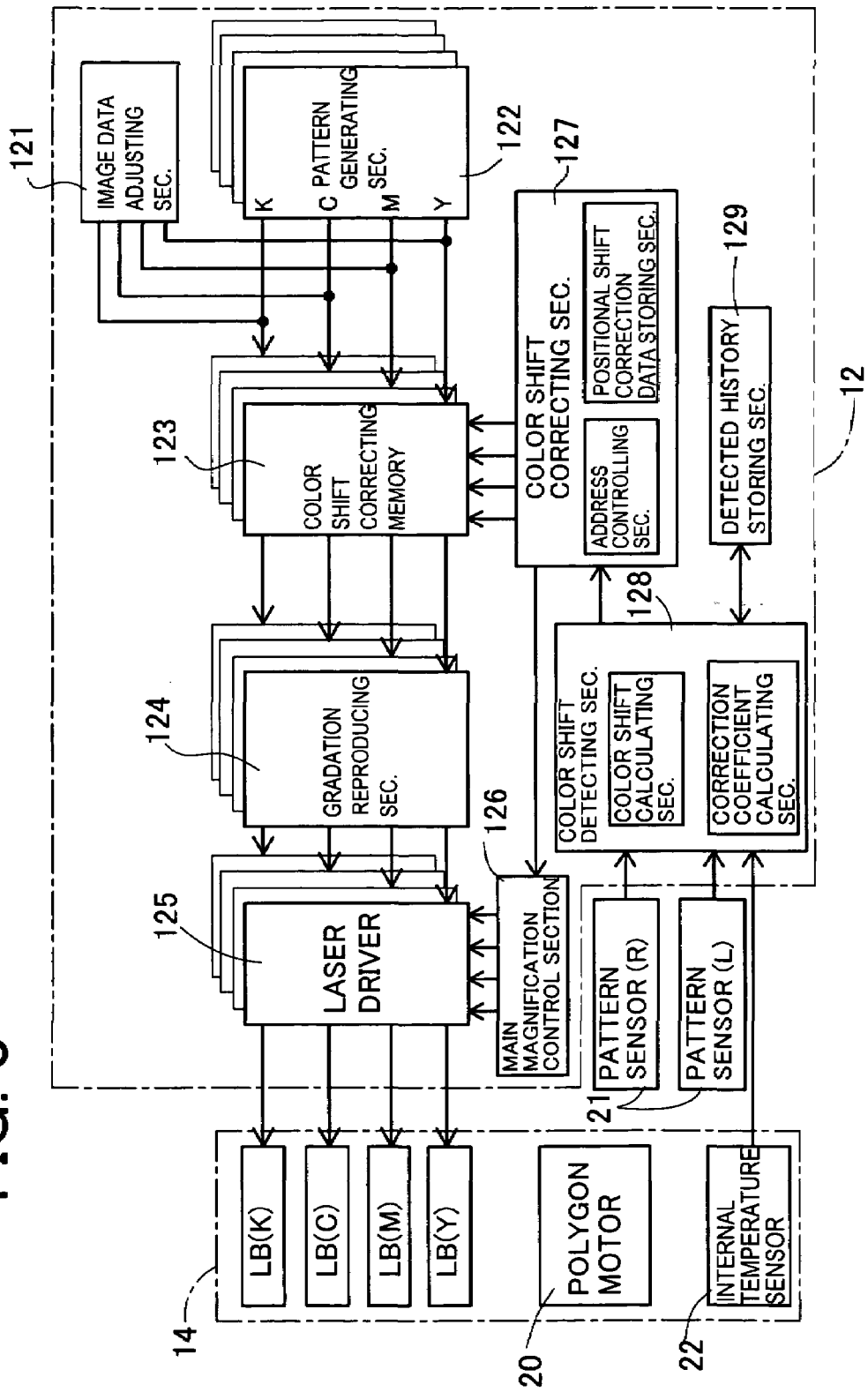
FIG. 3 is a block diagram showing structure of an image processing section of the present embodiment.

FIG. 3 shows a block structure of the image processing section 12. The image processing section 12 directed to FIG. 3 comprises an image data adjusting section 121, a pattern generating section 122, a color shift correction memory 123, a gradation reproducing section 124, a laser driver 125, a main magnification control section 126, a color shift correcting section 127, a color shift detecting section 128, and a detection history storing section 129.

The image data adjusting section 121 is a block that conducts various conversion processing such as color space conversion and the like for image data to be outputted from digital color printer 1 as a dopier or a printer and output the processed image data. The pattern generating section 122 is a block that outputs data of registered patterns formed on the intermediate transfer belt 25 under correction mode (described later). The color shift correction memory 123 is a block that applies sub scanning directional color shift correction to image data outputted from the image data adjusting section 121 or the pattern generating section 122. More specifically, sub scanning directional color shift correction is made such that image data is contemporarily recorded and is read out in accordance with delay address calculated at the color shift correcting section 127. Skew correction is also made along with readout timing.

The gradation reproducing section 124 is a block that conducts gradation reproducing process under predetermined image processing mode such as screen process, edge enhancement process, smoothing process, gamma correction, and the like. The laser driver 125 is a block that applies PWM control to the print head section 14 basing on image data obtained through gradation reproducing process so as to emit laser. At the time PWM control, the main magnification control section 126 conducts main scanning directional magnification correction and main scanning directional positional shift correction. The color shift detecting section 128 is a block that calculates color shift quantity of each color basing on a registered pattern on the intermediate transfer belt 25 detected by the pattern sensor 21. Furthermore, the detected history storing section 129 stores detected histories of color shift quantity by each temperature band basing on temperature information from the internal temperature sensor 22. Color shift correction quantity is calculated from detected histories of the color and current internal temperature. The color shift correcting section 127 is a block that determines sub scanning directional delay address and main scanning directional magnification coefficient basing on correction quantity calculated at the color shift detecting section 128, bow correction data of each color, and the like.

In the digital color printer 1, the image processing section 12 applies positional correction to image data so as to avoid positional shift of each color on the intermediate transfer belt 25. Correction mode is executed with appropriate timing to update correction quantity. Details of this operation will be described as below. There are two types of correction mode executed in the digital color printer 1, namely, first correction that gives preference to correction accuracy, and second correction mode that gives preference to processing time required for correction. First correction mode is executed when power is turned on, a front cover of the apparatus is opened/closed for changing consumable parts or for maintenance, and it returns to ON state from power-saving standby state. Second correction mode is executed when color printing operation is interrupted or operation is switched about every one hundred sheets of printing. In case of monochrome printing, correction mode is not executed.

Firstly, first correction mode will be described. When first correction mode is executed, main scanning directional registered patterns as shown in FIG. 4 and sub scanning directional registered patterns are formed on the intermediate transfer belt 25.

Figure 4:
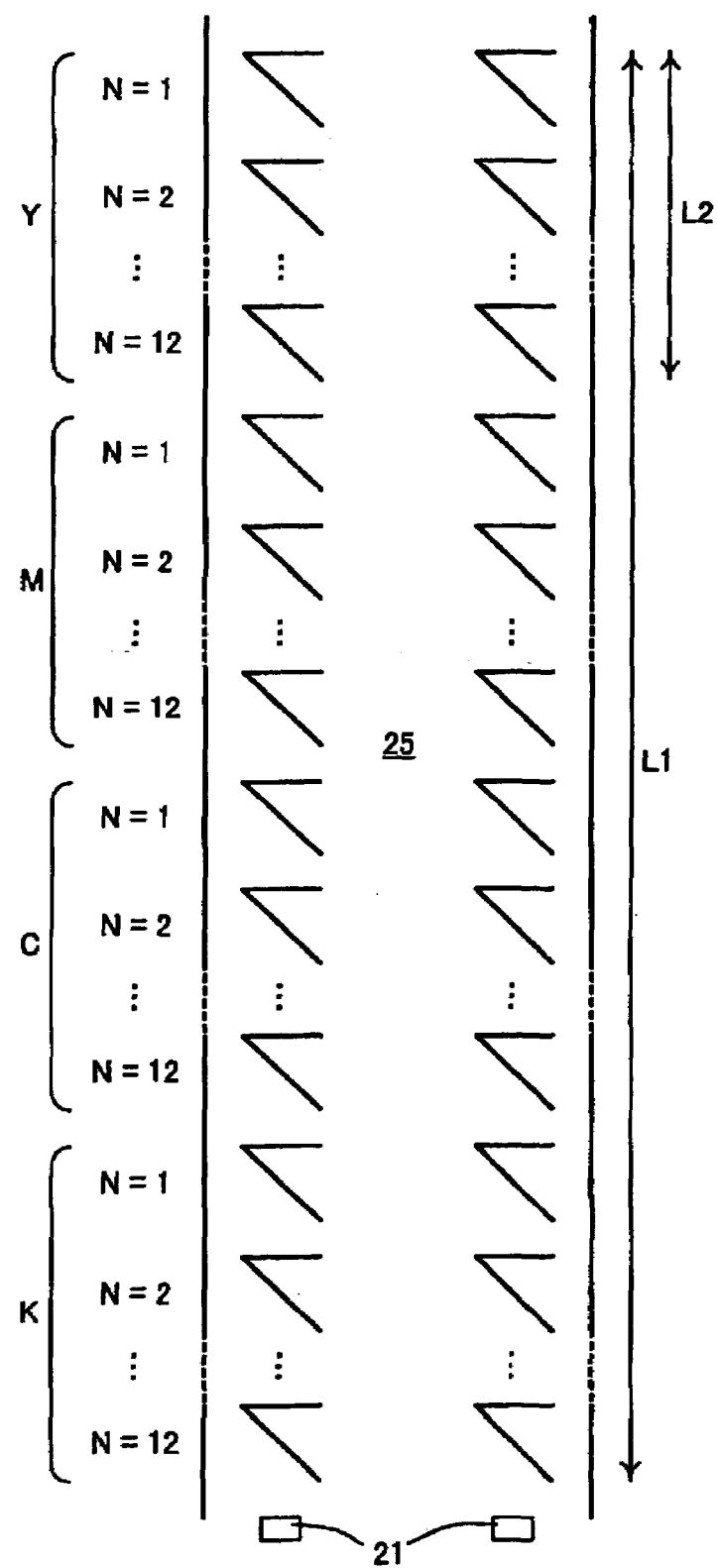
FIG. 4 shows a main scanning directional registered pattern under a first correction mode.
Figure 6:
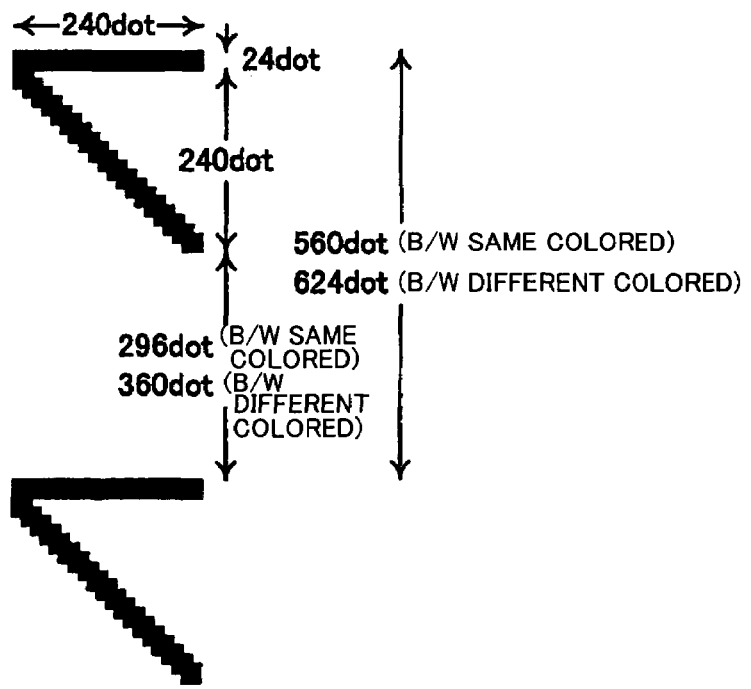
FIG. 6 shows unit figures of main scanning directional registered patterns.

Main scanning directional registered patterns shown in FIG. 4 consist of repetitions of unit figures arranged at both edges of an imaging region on the intermediate transfer belt 25. Number of repetitions is twelve per color, therefore forty-eight repetitions in total. A unit figure is a combination of a line segment in a main scanning direction and a line segment tilting by 45 degrees. To be more specific, as shown in FIG. 6, a width of a unit figure (length of a line segment in main scanning direction) is 240 dots (10.16 mm) and a width of a line segment in main scanning direction is 24 dots. A length in sub scanning direction with respect to a line segment tilting by 45 degrees is 240 dots. Accordingly, a length in sub scanning direction of a unit figure is 264 dots. Furthermore, an interval of adjoining unit figures in sub scanning direction is 296 dots in case of same colored unit figures and is 360 dots in case of different colored unit figures, larger by 64 dots than the case of same colored. Therefore, repetition pitch of a unit figure in sub scanning direction is 560 dots with respect to same colored unit figures. This is equivalent to one-fourth length of circumference of the photosensitive drum 15. Therefore, a pattern length L2 of each color is equivalent to of about three rounds of the photosensitive drum 15. This is long enough to cancel periodical noise matters due to shaft misalignment of the photosensitive drum 15 and the like. Furthermore, repetition pitch of a unit figure in sub scanning direction is 624 dots with respect to different colored unit figures. Therefore, a whole length L1 of main scanning directional registered patterns in FIG. 4 is 26766 dots. This is longer than a round of the intermediate transfer belt 25. Furthermore, the right column and the left column in FIG. 4 are arranged as close to both edges of an imaging region of the intermediate transfer belt 25 as possible. This intends to secure main scanning directional correction accuracy as much as possible. In this embodiment, its interval between both centers is 6144 dots.

Figure 7:
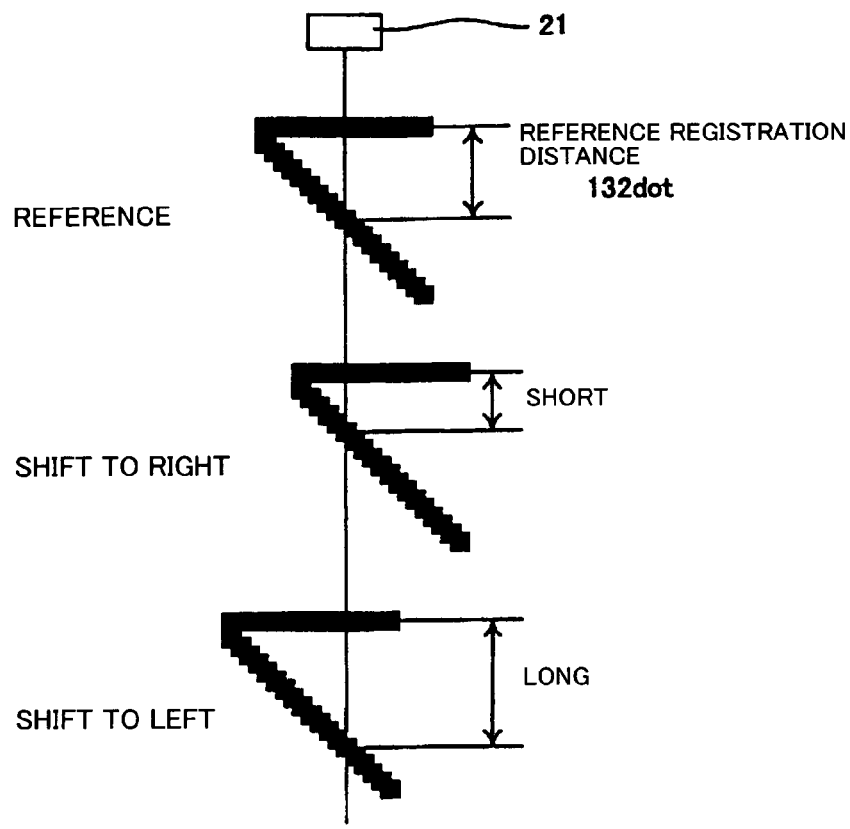
FIG. 7 is a diagram illustrating detection of positional shift quantity in a main scanning direction in accordance with main scanning directional registered patterns.

Main scanning directional positional shift quantity is detected using main scanning registered patterns, as shown in FIG. 7. That is, unit figures of main scanning directional registered patterns pass the pattern sensor 21 along with running of intermediate belt 25. Thereby, timing for a main scanning directional segment line to pass the pattern sensor 21 and timing for a 45-degree tilting segment line to pass are detected. Distance between the two segment lines (registration distance) at a reading point for the pattern sensor 21 can be detected from timing difference of the segment lines. In this embodiment, in case there is no positional shift as shown in top part of FIG. 7, its distance (reference registration distance) is 132 dots. However, in case of positional shift to right as shown in middle part, registration distance is shorter than the reference registration distance. On the contrary, in case of positional shift to left as shown in bottom part, registration distance is longer than the reference registration distance. Registration distance is thus used to detect main scanning directional positional shift quantity.

Figure 5:
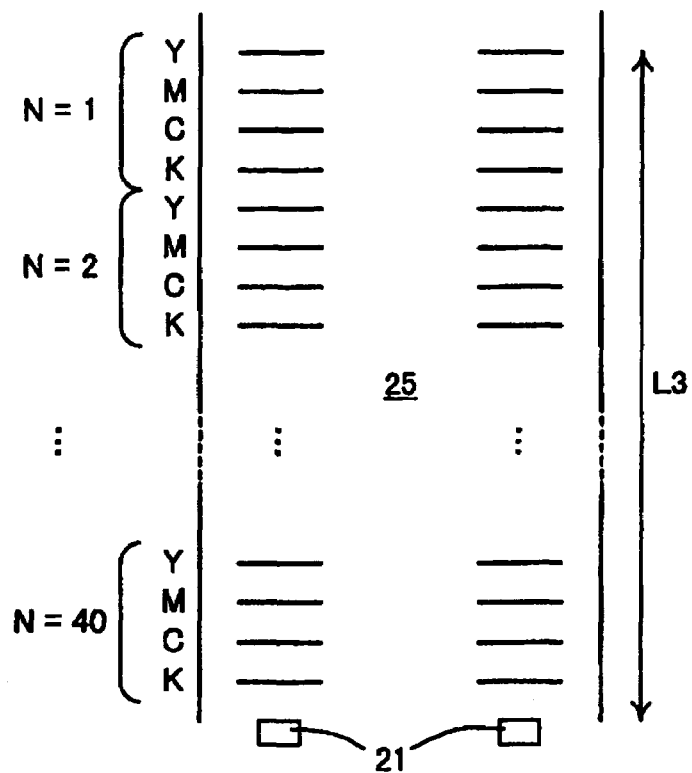
FIG. 5 shows a sub scanning directional registered pattern under a first correction mode.
Figure 8:
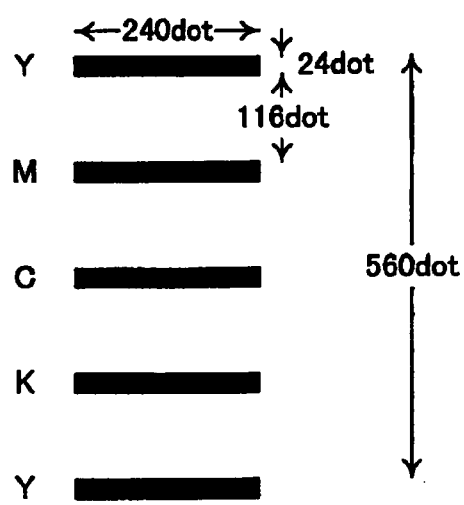
FIG. 8 is a diagram showing details of sub scanning directional registered patterns.

Next, sub scanning directional registered patterns shown in FIG. 5 consist of repetitions of main scanning directional segment lines arranged at both edges of an imaging region on the intermediate transfer belt 25. To be more specific, a segment line of each color (Y, M, C, and K) is grouped as a set of segment lines and forty sets are repeated to form the sub scanning directional registered patterns. As shown in FIG. 8, each segment line is a 24 dots×240 dots and an interval between adjoining segment lines is 116 dots. Accordingly, a length of a set of segment lines to be repeated is 560 dots. Accordingly, a whole length L3 of sub scanning directional registered patterns shown in FIG. 5 is 22400 dots. This is ten times as long as periphery of the photosensitive drum 15 and longer than a round of the intermediate transfer belt 25. That is, this is long enough to cancel periodical noises due to shaft misalignment of the photosensitive drum 15 and to cancel speed changing due to uneven thickness of the intermediate transfer belt 25.

Figure 9:
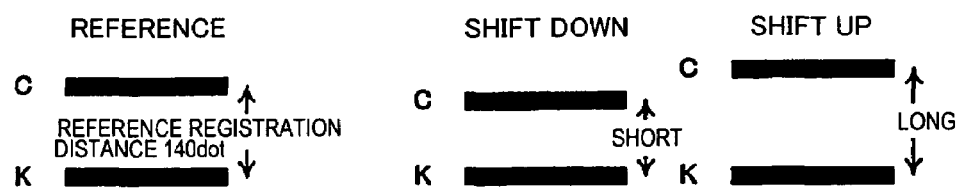
FIG. 9 is a diagram illustrating detection of positional shift quantity in a sub scanning direction in accordance with sub scanning directional registered patterns.

As shown in FIG. 9, sub scanning directional positional shift quantity is detected by using sub scanning directional registered patterns. That is, segment lines for sub scanning directional registered patterns pass the pattern sensor 21 along with running of the intermediate transfer belt 25. Thereby, timing for each segment line to pass the pattern sensor 21 is detected. Distance between two adjoining line segments at a reading point of the pattern sensor (registration distance) can be told from timing difference of two segment lines. In this embodiment, K (black) is assumed to be a reference color. In case C (cyan) does not have positional shift with reference to K such as shown in far left of FIG. 9, distance between C and K (reference registration distance) is 140 dots (between a center of K and that of C). However, in case of positional shift downward as shown in center of FIG. 9, registration distance is shorter than reference registration distance. On the contrary, in case of positional shift upward as shown in far light of FIG. 9, registration distance is longer than reference registration distance. In this embodiment, reference registration distance between M (magenta) and K is 280 dots and that between Y (yellow) and K is 420 dots. Sub scanning directional positional shift quantity is thus detected by making use of registration distance.

Figure 10:
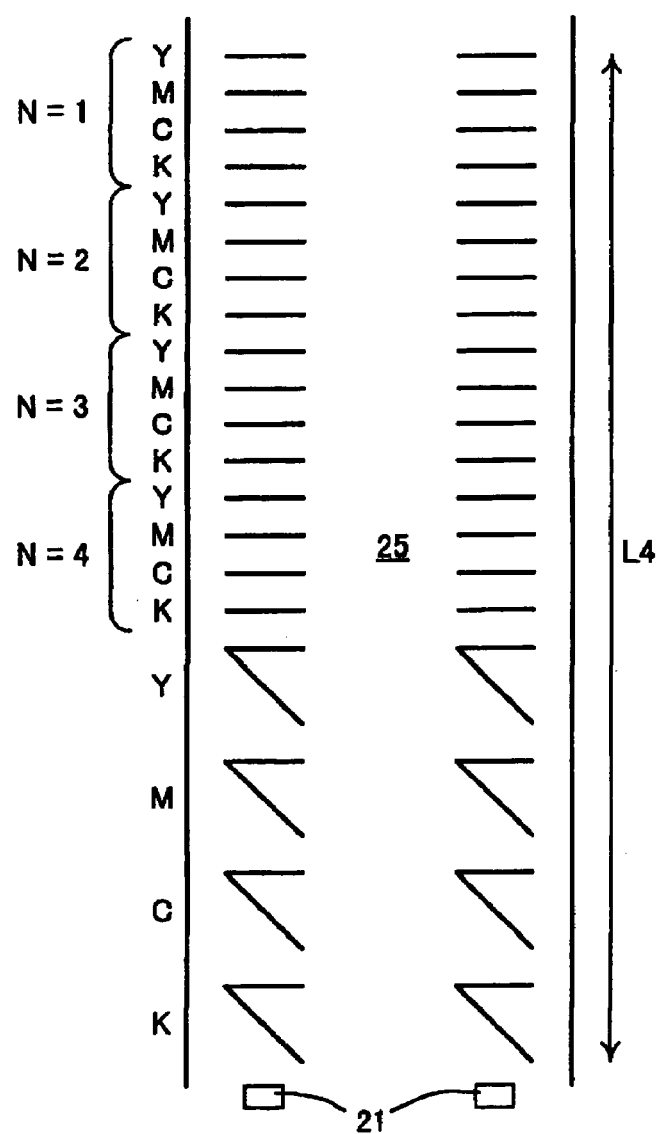
FIG. 10 is a diagram showing registered patterns under a second correction mode.

Next, second correction mode will be described. When second correction mode is executed, registered patterns as shown in FIG. 10 are formed on the intermediate transfer belt 25. The registered patterns of FIG. 10 include a section for detecting main scanning directional positional shift (lower part in FIG. 10) and a section for detecting sub scanning directional positional shift (upper part in FIG. 10). The section for detecting main scanning directional positional shift is a pattern that unit figure of each color for main scanning directional registered pattern (FIG. 4) under first correction mode is repeated once. The section for detecting sub scanning directional positional shift is a pattern that a set of four segment lines (per one for each color) for sub scanning directional registered pattern (FIG. 5) under first correction mode is repeated four times. Method to detect positional shift of each scanning direction is similar to case of first correction mode. Furthermore, sizes and arrangement pitch of a unit figure and the like are similar to case of first correction mode. Accordingly, whole length of the registered pattern L4 in FIG. 10 is 4480 dots. This length is equivalent to about two rounds of the photosensitive drum 15 and about one-fifth of a round of the intermediate transfer belt 25. Furthermore, this length is one-tenth or shorter than the whole length of the registered patterns (L1+L3).

Data for forming registered patterns under each correction mode are stored in the pattern generating section 122. Accordingly, as apparent from FIG. 3, color shift correction is executed when a registered pattern is formed. Correction quantity to be used then is determined basing on a result obtained under the last correction mode. Therefore, in case there is no change inside the machine in comparison with time of last correction mode being executed, there should naturally be no color shift with respect to registered patterns to be formed on the intermediate transfer belt 25. However, there actually arise various changing factors such as periodical noises due to shaft misalignment of the photosensitive drum 15 or the like, speed changing due to uneven thickness of the intermediate transfer belt 25 or the like, change of optical path length in the optical system due to change of internal temperature. Therefore, a touch of color shit occurs every time correction mode is executed.

Next, correction accuracy of each correction mode will be described.

Figure 11:
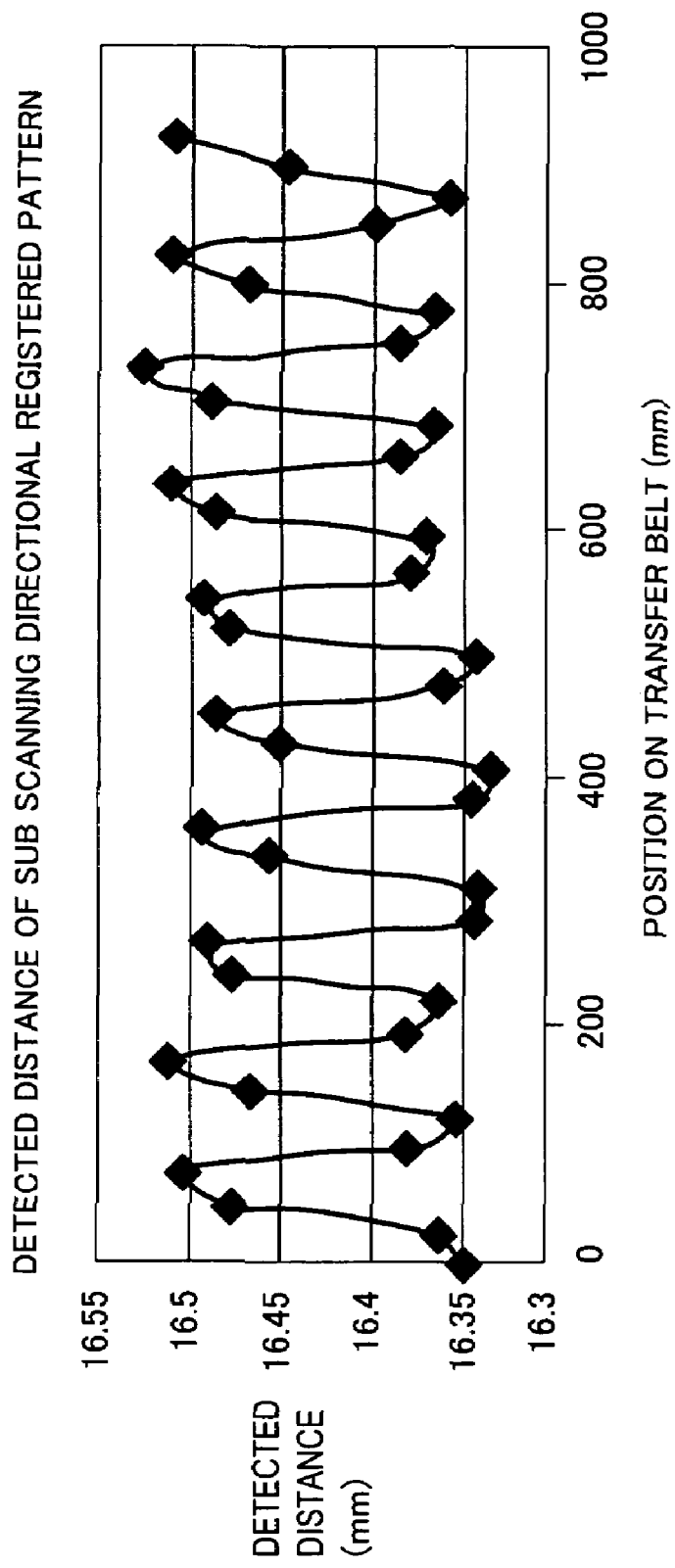
FIG. 11 is a graph showing tendency of detected distance with reference to a certain position on a transfer belt.

Firstly, correction accuracy in sub scanning direction will be described. FIG. 11 is a graph in which plotted forty sets of sub scanning directional registration patterns detected by sub scanning directional registered patterns (FIG. 5) under first correction mode that gives preference to correction accuracy. Here, FIG. 11 shows registration distance between the reference color K and one of the non-reference colors, namely, Y, M, or C. The graph of FIG. 11 indicates that there are two types of amplitude changing: changing by a short cycle consisting of four points with about 150 μm amplitude; and changing by a cycle much longer than the former one with about 30 μm amplitude. Short-cycled amplitude changing is caused by periodical noises due to shaft misalignment of the photosensitive drum 15. Long-cycled amplitude changing is caused by uneven thickness of the intermediate transfer belt 25. Under first correction mode, a long-cycled amplitude changing due to uneven thickness of the intermediate transfer belt 25 can be cancelled by making the entirety of the long-cycled amplitude mean level. That is, even only sub scanning directional registered patterns to be formed have a length longer than one round of the intermediate transfer belt 25. Accordingly, sub scanning directional correction accuracy under first correction mode is significantly high.

However, in case of second correction mode that gives preference to processing time required for correction, sub scanning directional registered patterns (upper part in FIG. 10) are as long as about only one round of the photosensitive drum 15. This is much shorter than one round of the intermediate transfer belt 25. Therefore, it is only short-cycled amplitude changing caused by the photosensitive drum 15 that can be cancelled under second correction mode. A long-cycled amplitude changing caused by the intermediate transfer belt 25 cannot be cancelled. Accordingly, sub scanning directional registration distance detected under second correction mode accounts for on which part of the intermediate transfer belt 25 a sub scanning directional registered pattern has been formed. From the graph of FIG. 11, it can read 30 μm. However, depending on individual differences of an intermediate transfer belt 25, a sub scanning directional registration distance may reach 60 μm. Therefore, sub scanning directional correction accuracy under second correction mode is low in comparison with first correction mode, due to part of the intermediate transfer belt 25 where a sub scanning directional registered pattern has been formed. However, processing time required for correction is shorter than a case of first correction mode.

Next, there will be described main scanning directional correction accuracy. As to main scanning direction also, correction accuracy under first correction mode that gives preference to correction accuracy is significantly high. This is because even at least main scanning directional registered patterns have a length same as or longer than one round of the intermediate transfer belt 25. That is, short-cycled amplitude changing due to the photosensitive drum 15 and long-cycled amplitude changing due to the intermediate transfer belt 25 are cancelled, similar to case of sub scanning directional correction.

However, as to main scanning direction, considerably high correction accuracy can be expected under second correction mode that gives preference to processing time required for correction, as well. In this regard, it is different from case of sub scanning directional correction. This is because, as to main scanning direction, registration distance is detected by distance between a line segment of a main scanning direction and a line segment tilting by 45 degrees, as described in FIG. 4 and FIG. 7. That is, main scanning directional registration distance is calculated by detecting distance in sub scanning direction. As shown in FIG. 6, distance of the two line segments is 240 dots at most. With such short distance, it is conceived that long-cycled amplitude changing due to the intermediate transfer belt 25, not to mention, and short-cycled amplitude changing due to the photo sensitive drum 15 be almost constant. Therefore, the above such changing factors are cancelled by eliminating distance of the two line segments. Therefore, main scanning directional correction accuracy is considerably high even under second correction mode.

Figure 12:
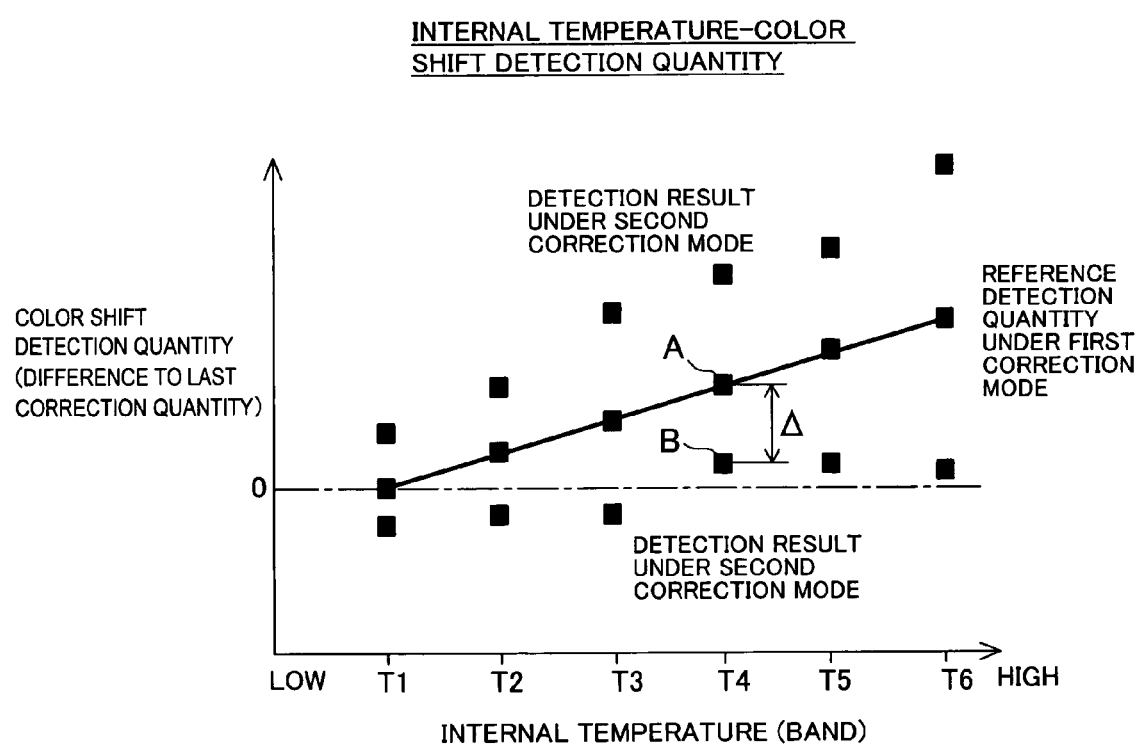
FIG. 12 is a graph showing tendency of relationship between internal temperature and detected quantity of color shift.

Next, influence of internal temperature will be described. FIG. 12 shows a graph illustrating relation and tendency between internal temperature and color shift detection quantity. Each point on a curve of "reference detection quantity by first correction mode" is put to plot registration distance of one of colors Y, M, and C detected under first correction mode by each temperature band. This curve reflects change of optical path length in the optical system caused by heat expansion and the like due to rise of temperature inside the apparatus. Although it depends on individual differences of products, tilting degree of this curve and sign of tilting (in case of FIG. 12, positive) is almost constant with respect to identical products. As to data of each point on the curve, initial values of respective temperature bands measured in a before-shipment test are stored in the image processing section 12. In the course of use after shipment, initial values are updated every time first correction mode is executed. It should be noted that off-set processing is applied to detection values of color shift quantity basing on an initial measurement result of before-shipment detection and temperature at that time. Furthermore, description of this paragraph regarding influence by internal temperature is held true of both main scanning direction and sub scanning direction.

The data of each point on this curve is also used as reference value to determine correction quantity under second correction mode. That is, when second correction mode obtains a detection result, difference Δ of an actual value obtained and data value on the curve belonging to temperature band at that time is obtained. The difference Δ is used for actual correction processing. Details of it will be described later.

Next, there will be described processing when correction mode is executed in the digital printer 1 of the present embodiment.

Firstly, there will be described data relating to execution of correction mode. In the detected history storing section 129, positional shift quantity history data are stored, shown in Table 1 as an example. Furthermore, an internal memory of the image processing section 12 stores reliability table shown in Table 2.

Positional shift quantity history data of Table 1 are data for showing points to be plotted on the curve of FIG. 12 as "reference detection quantity obtained under first correction mode". Table 1 shows last five detections of positional shift quantity under first correction mode by each color Y, M, and C with respect to main scanning direction and sub scanning direction. Data plotted in FIG. 12 relates to one of the colors Y, M, and C with respect to either one of the two scanning directions, which reflects last five detections. Table 1 relates to data belonging to an internal temperature band of "under 25° C." (corresponding to T1 in FIG. 12). Not to mention, similar history data are provided for other temperature band also. It should be noted that, at the time of shipment, data obtained in a before-shipment test are recorded as shown in Table 1, wherein data are last five times of detection (n: 1–5).

TABLE 1

Positional Shift Quantity Histories

Unit: dot

| | | Y | | M | | C | |
|---|---|---|---|---|---|---|---|
| | | MAIN | SUB | MAIN | SUB | MAIN | SUB |
| n | 1 | +1 | +2 | 0 | +1 | 0 | +2 |
| | 2 | −1 | −3 | +1 | +2 | +1 | +3 |
| | 3 | 0 | +4 | −1 | +2 | +1 | +4 |
| | 4 | +1 | 0 | 0 | +4 | 0 | +2 |
| | 5 | 0 | +1 | −1 | 0 | −1 | +1 |

TABLE 2

Reliability Table

| | | Temperature Band (° C.) | | | |
|---|---|---|---|---|---|
| | | ~25 | 25~35 | 35~45 | 45~ |
| Δ (dot) | 0 | 0.80 | 0.75 | 0.70 | 0.65 |
| | 1 | 0.75 | 0.70 | 0.65 | 0.60 |
| | 2 | 0.70 | 0.65 | 0.60 | 0.55 |
| | 3 | 0.65 | 0.60 | 0.55 | 0.45 |
| | 4 | 0.60 | 0.55 | 0.45 | 0.40 |
| | 5 | 0.55 | 0.45 | 0.40 | 0.35 |
| | 6 | 0.45 | 0.40 | 0.35 | 0.30 |
| | 7 | 0.40 | 0.35 | 0.30 | 0.25 |
| | 8 | 0.35 | 0.30 | 0.25 | 0.20 |
| | 9 | 0.30 | 0.25 | 0.20 | 0.15 |
| | 10~ | 0.25 | 0.20 | 0.15 | 0.10 |

Table 2 is provided so as to assign a reliability coefficient (correction coefficient) value for determining sub scanning directional correction quantity under second correction mode. Each data in this table shows coefficients to compensate not-so-high sub scanning directional correction accuracy under second correction mode. In this table, for a band of lower temperature, a higher coefficient value is designated and vice versa, for a band of higher temperature, a lower value is designated. Furthermore, as Δ is smaller, a higher value is designated, and vice versa, as larger Δ is, a lower value is designated. This means that as higher temperature detected by the internal temperature sensor 22 is or as larger Δ detected under second correction mode is, correction accuracy is low.

The above situation takes place due to the following reasons. For example, in case while temperature is rising for operation, there may occur that internal temperature cannot keep up and results in light path length quite off its usual value. Thereby, color shift quantity detected tends to be larger than actual color shift quantity, which is an error. Such an error is not cancelled out sufficiently under second correction mode in which registered pattern length is short. In case a temperature band is high and Δ is large, such an error can possibly take place. That is, reliability is low. On the other hand, in case the internal temperature is saturated though internal temperature is high, color shift quantity detected never becomes excessively large. In case measured Δ is small, color shift quantity can possibly be suppressed to not-excessively large. That is, reliability is comparatively high. Table 2 is provided to cope with errors caused by the above such tendencies.

Figure 13:
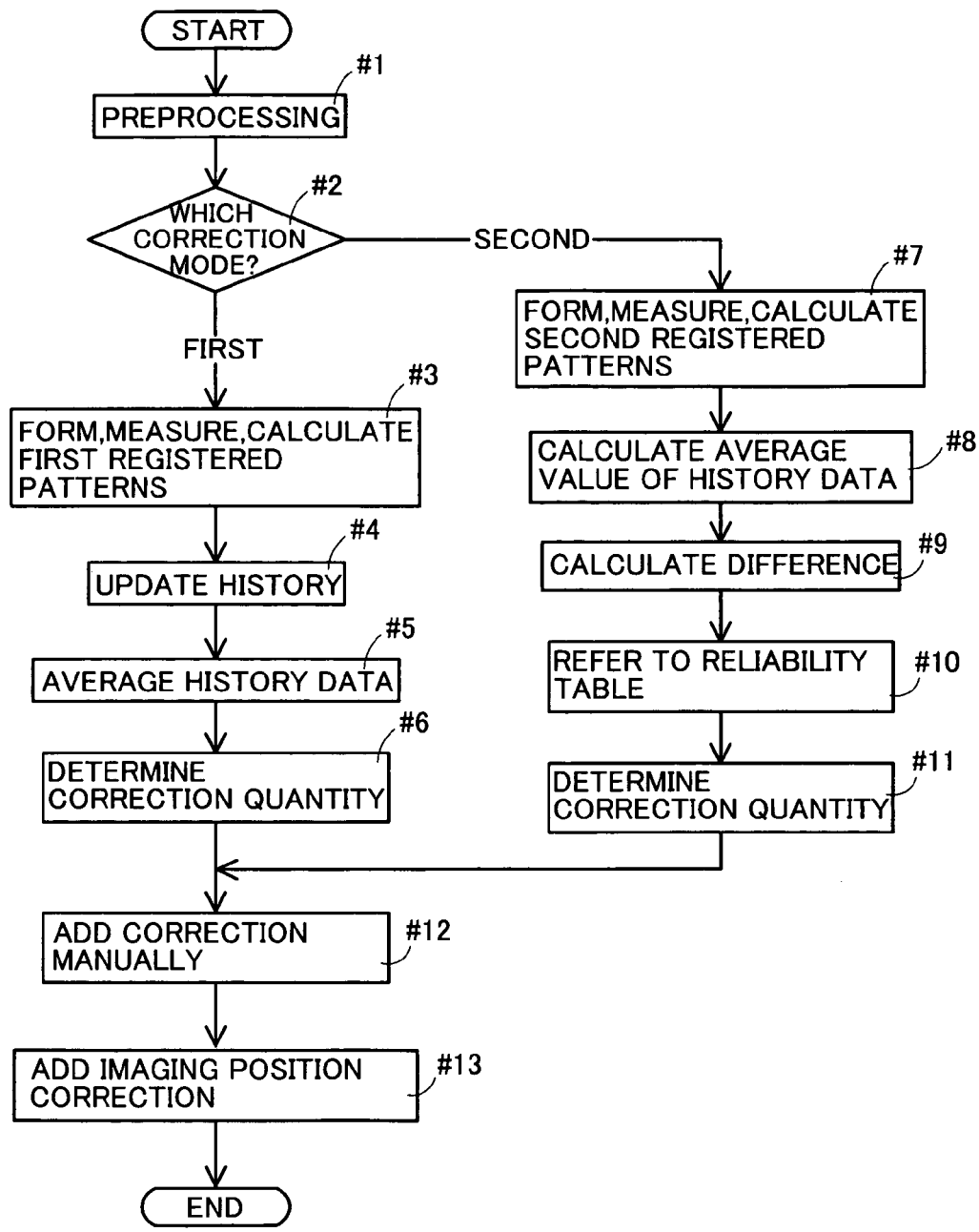
FIG. 13 is a flow chart showing execution of a correction mode.

Next, processing for executing correction mode will be described by referring to a flow chart shown in FIG. 13. For executing correction mode, preprocessing is firstly conducted (#1). Contents of preprocessing include light quantity correction of a pattern sensor, bow correction and determination of temperature band. Light quantity correction of a pattern sensor means calibration of detection intensity required for the pattern sensor 21 to appropriately detect registered patterns. Here, light quantity is adjusted such that voltage detected with face of the intermediate transfer belt 25 should converge within a predetermined range. Bow correction means correction for canceling bow distortion of each color at the print head section 14. Therefore, data obtained by adding bow data of each color and previous correction data is supplied for the color shift correcting section 127. Thereby, address control including bow correction is applied to patterns to be formed on the intermediate transfer belt 25. Determination of temperature band is to determine which temperature band shown in Table 2 should be used. Therefore, pluralities of temperature detected at the internal temperature sensor 22 are sampled to determine which temperature band to use.

Next, which correction mode is executed this time is determined, i.e., first correction mode or second correction mode (#2). A determination is made in accordance with criteria described in paragraph 0022. In case it is determined to execute first correction mode (#2: first), it goes on to #3. In case determined to execute second correction mode (#2: second), it goes on to #7.

In case first correction mode is executed (#2: first), first registered patterns are formed on the intermediate transfer belt 25, registration distance is measured, and color shift data is calculated basing on obtained registration distance.

First registered patterns are patterns shown in FIG. 4 and FIG. 5. First registered patterns formed herein reflect corrections basing on a positional shift correction value determined in the last correction mode (first or second does not matter). Similar to case of forming an ordinary image, processing by the color shift correction section 127 is applied.

In accordance with a manner as shown in FIG. 7, main scanning directional registration distance is measured by using the first registered patterns. Furthermore, sub scanning directional registration distance is measured in accordance with a manner as shown in FIG. 9. A difference of main scanning directional registration distance from its reference and that of sub scanning directional registration distance from its reference are calculated, whereby positional shift quantity and direction of the positional shift are measured. There are twelve sets of positional shift quantity to be measured for each of the colors Y, M, and C with respect to main scanning direction. There are forty sets for each of the colors Y, M, and C with respect to sub scanning direction. Above those sets of positional shift quantity are averaged by each color and by each scanning direction. Thereby, short-cycled changing due to the photosensitive drum 15 and long-cycled changing due to the intermediate transfer belt 25 are cancelled. This is because both main scanning directional registered patterns and sub scanning directional registered patterns have their lengths same as or longer than one round of the intermediate transfer belt 25. Accordingly, there can be obtained data of positional shift quantity from which influence of the above such changing factors is excluded.

Next, difference of positional shift quantity used at last correction mode and that currently obtained is calculated. That is, net positional shift quantity without correction is calculated herein. For example, suppose that there has been detected +30 μm of positional shift with respect to a certain color and a certain scanning direction in the last correction mode. And suppose that there is detected −10 μm of positional shift with respect to the same color and same direction in the current correction mode. In this case, −30 μm of correction is made for the color and the direction this time of pattern forming. This correction is made in order to cancel the last positional shift quantity. Accordingly, net value of current positional shift for the same color and same direction in this time is +20 μm as a result of offset. That is all the processing at #3.

Next, history of positional shift quantity is updated (#4). That is, positional shift quantity data such as shown in Table 1 is provided for each temperature band. Positional shift quantity history data of a target temperature are updated in accordance with latest positional shift quantity calculated in #3. To be specific, the oldest one among positional quantity history is deleted and the latest one is entered for record, instead. Not to mention, a target temperature band is the one determined at #1 basing on temperature detected by the internal temperature sensor 22. It is acceptable that history data may be updated only in case new positional shift quantity is within a predetermined range with reference to certain positional shift quantity in the history. That is, in case new positional shift quantity is too away off from the past tendency, there is conceived of possibility that something wrong happens in the course of forming registered patterns or measuring distance, for example, registered patterns are formed on a scarred portion on the intermediate transfer belt 25 (though such a scarred portion is avoided for normal image formation). In such a case, processing of #3 should be retried or processing would better to be stopped with alarm going off.

Next, an average value of positional shift quantity history data after being updated is calculated (#5). Thereby, values of positional shift quantity under first correction mode are averaged for last five values belonging to a same temperature band containing currently obtained value. Thereby, even if abnormal measurement is made due to noises or the like, influence of it is lessened. An average value of thus obtained positional shift quantity history data (including color and direction factors) is simply determined as color shift quantity under correction mode of this time. That is, under first correction mode, reliability coefficient is "1" with respect to both main scanning direction and sub scanning direction. That is, from the reason as described in the above, measurement accuracy of registration distance is high under first correction mode. Thereby, correction quantity is determined (#6). Next, in case a user has manually designated correction manner with an operation panel (#12), and in case imaging position in a printing sheet is designated (#13), correction to meet the designation is made (#13). A color shift value of each color and each direction is thus determined.

In case that it is judged as "second" at #2, second correction mode is executed. Under second correction mode, second registered patterns are formed on the intermediate transfer belt 25, registration distance is measured, and color shift data is calculated basing on obtained registration distance (#7).

Second registered patterns are patterns shown in FIG. 10. Similar to the case of first correction mode, second registered patterns formed herein reflect corrections basing on a positional shift correction value determined in the last correction mode (first or second does not matter).

In accordance with a manner as shown in FIG. 7 and FIG. 9, main and sub scanning directional registration distances are measured by using the second registered patterns. A difference of main scanning directional registration distance from its reference and that of sub scanning directional registration distance from its reference are calculated, whereby positional shift quantity and direction of the positional shift are measured. There is a set of positional shift quantity to be measured for each of the colors Y, M, and C with respect to main scanning direction. There are four sets for each of the colors Y, M, and C with respect to sub scanning direction. Above those sets of positional shift quantity in sub scanning direction are averaged by each color. Thus obtained positional shift quantity of sub scanning direction under second correction mode reflects a changing factor of the intermediate transfer belt 25. Therefore, accuracy of positional shift quantity of sub scanning direction under second correction mode is considerably low in comparison with a case of first correction mode. On the other hand, accuracy of positional shift quantity of main scanning direction under second correction mode is higher than that of sub scanning direction, though not as high as the case of first correction mode. This is because changing factors are cancelled by taking a difference of a line segment of main scanning direction and a line segment tilting by 45 degrees.

Similar to a case of #3 under first correction mode, difference of positional shift quantity used at last correction mode and that currently obtained is calculated. Thereby, net positional shift quantity provided that no correction is made is calculated. This is the processing to be done in #7.

Next, an average value of positional shift history data belonging to a target temperature band is calculated (#8). Not to mention, a target temperature band corresponds to a temperature band determined basing on temperature detected by the internal temperature sensor 22 in #1. Thereby, it is determined which point on the curve of "reference detection quantity by first correction mode" in the graph of FIG. 12 should be regarded as reference. Suppose that a temperature band determined in #1 is a band in which T4 is centered, a reference point should be point A in FIG. 12.

Next, there is calculated a difference of net positional shift quantity obtained in #7 and an average value of history data obtained in #8 (#9). Suppose that net positional shift quantity obtained in #7 is a point B in FIG. 12, a difference Δ (including an arithmetic sign) is obtained. This indicates which direction and how much a correction value which the color shift correcting section 127 currently holds should be changed. However, the data herein are obtained under second correction mode that gives preference to processing time required for correction rather than correction accuracy. Therefore, as described in the above, accuracy especially in sub scanning direction is low under second correction mode. Accordingly, if a difference calculated herein is simply applied, this could possibly be excessive changing.

Therefore, reliability table shown in Table 2 is referred (#10). That is, a reliability coefficient is read out from Table 2 basing on a temperature band determined at #1 and an absolute value of a difference Δ obtained in #9.

Next, correction quantity is determined (#11). Determination of correction quantity under second correction mode is made in accordance with an expression as indicated below.

$$CQ = CQ_L - (SQ \times R)$$

CQ: correction quantity
$CQ_L$: last correction quantity
SQ: current positional shift quantity
R: reliability coefficient Current positional shift quantity corresponds to net positional shift quantity obtained in #7. Calculation following the above expression is done for both main scanning direction and sub scanning direction, of course. For calculation with respect to sub scanning direction, a coefficient read from Table 2 at #10 is used as "reliability coefficient". As apparent from Table 2, this coefficient is within a range between 0.10 and 0.80. That is, positional shift quantity obtained at #7 is suppressed from being way off. In other words, use of a coefficient prevents excessive correction which would be done if a measurement result of low accuracy was simply applied. On the other hand, as to main scanning direction, "reliability coefficient" following the above expression is fixed to 0.9 as a fixed value. This is because considerably high reliability can be expected with respect to main scanning direction, even though it is second correction mode, as described in the above. That is, under second correction mode, a value smaller than "1" but approximating to "1" is used as correction coefficient for main scanning direction, and a value smaller than a correction coefficient for main scanning direction is used as a correction coefficient for sub scanning direction. Correction quantity under second correction mode is thus determined.

In case a user has manually designated correction manner with an operation panel (#12), and in case imaging position in a printing sheet is designated (#13), correction to meet the designation is made (#13). A color shift value of each color and each direction is thus determined.

As described, the digital color printer and the digital color copier directed to the present embodiment have two types of color shift correction mode for evading color shift, namely, first correction mode that gives preference to correction accuracy, and second correction mode that gives preference to processing time required for correction. Under first correction mode, registered patterns total length of which is same as or longer than a round of the intermediate transfer belt 25 are formed with respect to main scanning direction and sub scanning direction, whereby periodical changing is cancelled with high accuracy. On the other hand, under second correction mode, registered patterns total length of which is much shorter than case of first correction mode are used so that the correction mode terminate in a short time. Furthermore, the digital color printer and digital color copier in the present embodiment have the internal temperature sensor 22. Furthermore, last five detections of positional shift quantity history under first correction mode are saved for each internal temperature band.

Thereby, when first correction mode is executed, an average value of last five detected positional shift quantity including this time, with respect to a target temperature band, is used for correction. Therefore, even if an abnormal measurement result due to noises or the like is obtained, influence of it is not reflected on correction processing.

Furthermore, when second correction mode is executed, a correction is made by taking a difference of a measurement result of this time and an average value of the last five detected positional shift quantity under first correction mode with respect to the target temperature band. Furthermore, an obtained difference value is multiplied by a predetermined reliability coefficient so as to compensate low accuracy. Thereby, even under second correction mode wherein correction accuracy is low, changing of a correction value with excessive degree is prevented. As to main scanning direction under second correction mode, a reliability coefficient is fixed to a value approximating to "1", as a fixed value. This is because, not as high as a case of first correction mode but comparatively high correction accuracy can be expected. On the other hand, as to sub scanning direction, a reliability coefficient is set to a value lower than that of main scanning direction and it is a variable depending on internal temperature, a difference measured. Thereby, there is prevented excessive change of a correction value with respect to sub scanning direction that is likely to receive influence of changing factors especially.

There are thus realized a digital color printer and a digital color copier capable of making corrections not too way off from change of actual positional shift quantity under second correction mode that gives preference to processing time required for correction and, of course, under first correction mode that gives preference to correction accuracy. Therefore, a color image can be formed without great amount of color shift. Furthermore, even if internal temperature continuously changes depending on used state of the machine, a color image can be formed with little color shift while interruption of image formation being suppressed as much as possible.

The above described embodiments are provided for mere illustrative purpose, and the present invention is not limited thereto. Of course, various modifications or variations can occur without departing the spirit of the invention. For example, in the embodiment, K (black) is designated as reference color and positional shift correction is made to meet image transfer positions of other colors with the transfer position of K. However, reference color is not necessarily designated to K but one of the other three colors can be a reference color or, image transfer positions of the four colors can be met with a virtual reference position without designating reference color. Furthermore, shapes of registered patterns and location of the pattern sensor 21 are not particularly limited to what are illustrated in the drawings. Location of internal temperature sensor 21 and division of temperature are not particularly limited to as illustrated.

Furthermore, the number of positional shift quantity history to be saved under first correction mode is not limited to five. Furthermore, instead of an average value, a center value or other representative value may be used at #5 and #8 in the flow chart of FIG. 13. Furthermore, a reliability coefficient of main scanning direction under second correction mode is not limited to 0.9 but it may be within a range between 0.8 and 1. Furthermore, reliability coefficients of sub scanning direction are not particularly limited to values as shown in Table 2.

As apparent from the forgoing description, the present invention provides an image forming apparatus and image forming method capable of obtaining a considerably high-quality image output even under a correction mode that gives preference to processing time required for correction, and capable of suppressing interruption of image formation to the utmost under operational condition such that internal temperature changes continuously.

What is claimed is:
1. An image forming apparatus comprising:
    plural image forming sections; and
    a carrying belt on which primary images formed on the plural image forming sections respectively are transferred and superimposed,
    wherein the image forming apparatus further comprises:
    a test pattern forming device for forming test patterns on the carrying belt by using the plural image forming sections;
    a pattern sensor for reading a test pattern on the carrying belt;
    a positional shift calculating device for calculating positional shift quantity of main scanning direction and that of sub scanning direction basing on read result by the pattern sensor with respect to at least one correction target color;
    a correction quantity determining device for determining correction quantity of each scanning direction with respect to a correction target color(s) basing on positional shift quantity of each scanning direction calculated by the positional shift calculating device and reliability coefficient of each scanning direction; and
    a positional correction device for conducting positional correction basing on correction quantity determined by the correction quantity determining device with respect to an images of a correction target color(s), out of respective images to be formed by the plural image forming sections, and
    reliability coefficients used by the correction quantity determining device differ by a main scanning direction and a sub scanning direction.

2. An image forming apparatus according to claim 1, wherein, for forming a test pattern by the test pattern forming device, there are:
    a first correction mode for forming a test pattern which is as long as one round or more of the carrying belt; and
    a second correction mode for forming a test pattern which is shorter than one round of the carrying belt.

3. An image forming apparatus according to claim 2, wherein the correction quantity determining device uses:
    1, as reliability coefficient with respect to both positional shift quantity of main scanning direction and that of sub scanning direction obtained under first correction mode;
    a positive value same as or smaller than 1, as reliability coefficient of main scanning direction with respect to positional shift quantity obtained under second correction mode; and
    a positive value same as or smaller than reliability coefficient of main scanning direction for second correction mode, as reliability coefficient of sub scanning direction with respect to positional shift quantity obtained under second correction mode.

4. An image forming apparatus according to claim 3 further comprising:
    a temperature information obtaining unit for obtaining information of temperature inside of the image forming apparatus; and
    a reliability coefficient determining device for determining reliability coefficient of sub scanning direction under second correction mode that is used at the correction quantity determining device basing temperature information obtained by the temperature information obtaining unit.

5. An image forming apparatus according to claim 3, wherein the correction quantity determining device uses a fixed value same as or higher than 0.8 as reliability coefficient of main scanning direction for second correction mode.

6. An image forming apparatus according to claim 4, wherein the correction quantity determining device uses a fixed value same as or higher than 0.8 as reliability coefficient of main scanning direction for second correction mode.

7. An image forming apparatus according to claim 4, further comprising a history recording unit for recording a history of positional quantity that the positional shift quantity calculating device calculated in the past, wherein
the reliability coefficient determining device determines sub scanning directional reliability coefficient for second correction mode basing on difference of recent predetermined times of history representative value of positional shift quantity recorded on the history recording unit and positional shift quantity that the positional shift calculating device has calculated this time.

8. An image forming apparatus according to claim 5, further comprising a history recording unit for recording a history of positional quantity that the positional shift quantity calculating device calculated in the past, wherein
the reliability coefficient determining device determines sub scanning directional reliability coefficient for second correction mode basing on difference of recent predetermined times of history representative value of positional shift quantity recorded on the history recording unit and positional shift quantity that the positional shift calculating device has calculated this time.

9. An image forming apparatus according to claim 6, further comprising a history recording unit for recording a history of positional quantity that the positional shift quantity calculating device calculated in the past, wherein
the reliability coefficient determining device determines sub scanning directional reliability coefficient for second correction mode basing on difference of recent predetermined times of history representative value of positional shift quantity recorded on the history recording unit and positional shift quantity that the positional shift calculating device has calculated this time.

10. An image forming apparatus according to claim 7, wherein the history recording unit records a history of positional shift quantity calculated under first correction mode.

11. An image forming apparatus according to claim 8, wherein the history recording unit records a history of positional shift quantity calculated under first correction mode.

12. An image forming apparatus according to claim 7,
wherein the history recording unit records positional shift quantity classifying by temperature band basing on temperature information that the temperature information obtaining unit obtained when positional shift quantity is calculated, and
the reliability coefficient determining device determines sub scanning directional reliability coefficient for second correction mode basing on predetermined times of recent histories of a temperature band to which temperature information obtained this time belongs, out of plural positional shift quantity recorded in the history recording unit.

13. An image forming apparatus according to claim 8,
wherein the history recording unit records positional shift quantity classifying by temperature band basing on temperature information that the temperature information obtaining unit obtained when positional shift quantity is calculated, and
the reliability coefficient determining device determines sub scanning directional reliability coefficient for second correction mode basing on predetermined times of recent histories of a temperature band to which temperature information obtained this time belongs, out of plural positional shift quantity recorded in the history recording unit.

14. An image forming apparatus according to claim 10,
wherein the history recording unit records positional shift quantity classifying by temperature band basing on temperature information that the temperature information obtaining unit obtained when positional shift quantity is calculated, and
the reliability coefficient determining device determines sub scanning directional reliability coefficient for second correction mode basing on predetermined times of recent histories of a temperature band to which temperature information obtained this time belongs, out of plural positional shift quantity recorded in the history recording unit.

15. An image forming apparatus according to claim 11,
wherein the history recording unit records positional shift quantity classifying by temperature band basing on temperature information that the temperature information obtaining unit obtained when positional shift quantity is calculated, and
the reliability coefficient determining device determines sub scanning directional reliability coefficient for second correction mode basing on predetermined times of recent histories of a temperature band to which temperature information obtained this time belongs, out of plural positional shift quantity recorded in the history recording unit.

16. An image forming apparatus according to claim 10 further comprising an updating device for updating contents of record in the history recording unit when the positional shift calculating unit calculates positional shit quantity under first correction mode,
wherein the correction quantity determining device determines correction quantity for first correction mode basing on a representative value of predetermined times of recent histories after being updated by the updating device.

17. An image forming apparatus according to claim 11 further comprising an updating device for updating contents of record in the history recording unit when the positional shift calculating unit calculates positional shit quantity under first correction mode,
wherein the correction quantity determining device determines correction quantity for first correction mode basing on a representative value of predetermined times of recent histories after being updated by the updating device.

18. An image forming apparatus according to claim 14 further comprising an updating device for updating contents of record in the history recording unit when the positional shift calculating unit calculates positional shit quantity under first correction mode,
wherein the correction quantity determining device determines correction quantity for first correction mode basing on a representative value of predetermined times of recent histories after being updated by the updating device.

19. An image forming apparatus according to claim 15 further comprising an updating device for updating contents of record in the history recording unit when the positional shift calculating unit calculates positional shit quantity under first correction mode, wherein the correction quantity determining device determines correction quantity for first correction mode basing on a representative value of predetermined times of recent histories after being updated by the updating device.

20. Image forming method using plural image forming sections and a carrying belt on which primary images formed on the plural image forming sections respectively are transferred and superimposed, the image forming method comprising the steps of:

forming test patterns on the carrying belt by using the plural image forming sections;

reading a test pattern on the carrying belt with a pattern sensor;

calculating positional shift quantity of main scanning direction and that of sub scanning direction basing on read result by the pattern sensor with respect to at least one correction target color;

determining correction quantity of each scanning direction with respect to a correction target color(s) basing on positional shift quantity of each scanning direction and reliability coefficient of each scanning direction; and conducting positional correction basing on determined correction quantity, out of respective images to be formed by the plural image forming sections, wherein reliability coefficients used for determining correction quantity differ by a main scanning direction and a sub scanning direction.

* * * * *

UNITED STATES PATENT AND TRADEMARK OFFICE
CERTIFICATE OF CORRECTION

PATENT NO.         : 7,133,056 B2                                    Page 1 of 1
APPLICATION NO. : 10/810895
DATED              : November 7, 2006
INVENTOR(S)        : Tomoji Tanaka et al.

It is certified that error appears in the above-identified patent and that said Letters Patent is hereby corrected as shown below:

In claim 19, column 19, line 7, delete the word "shit" and replace it with the word --shift--.

Signed and Sealed this

Third Day of April, 2007

JON W. DUDAS
*Director of the United States Patent and Trademark Office*